Jan. 12, 1954      W. L. BARROW      2,666,132
ULTRAHIGH-FREQUENCY BRIDGE CIRCUIT AND APPARATUS
Filed Jan. 25, 1947      5 Sheets-Sheet 1

INVENTOR.
WILMER L. BARROW
BY
Paul B. Hunter
ATTORNEY

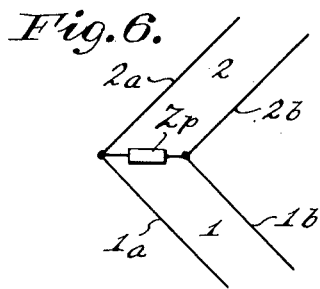
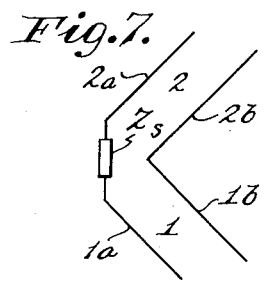
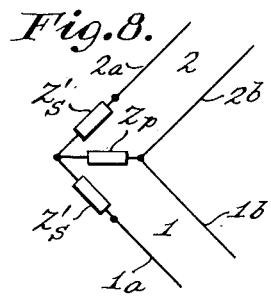
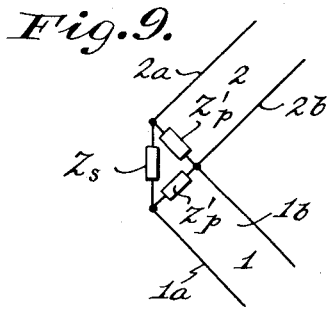
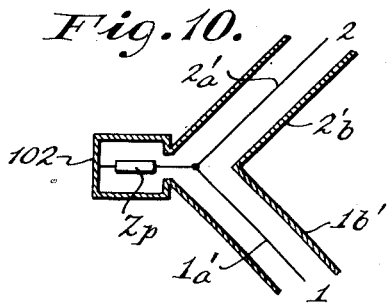
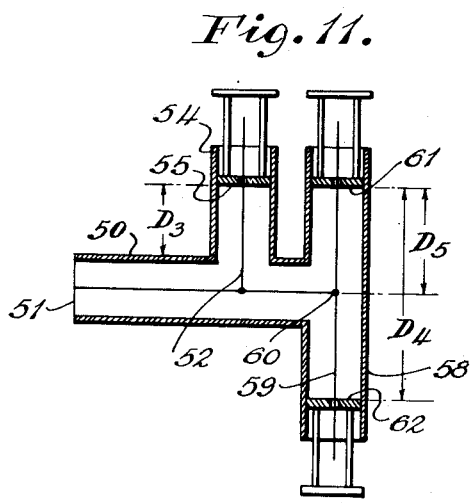
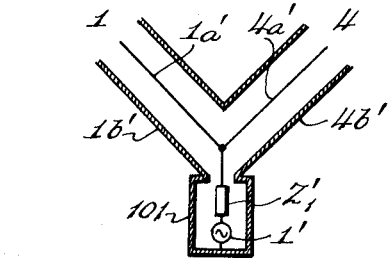
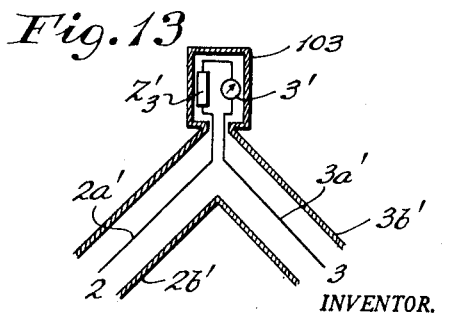
INVENTOR.
WILMER L. BARROW
BY
ATTORNEY

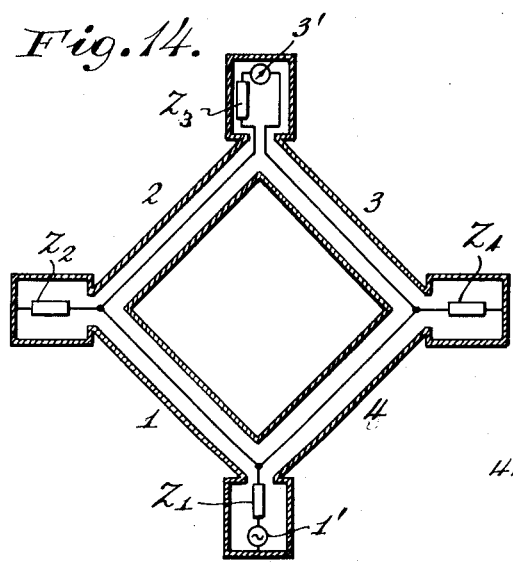
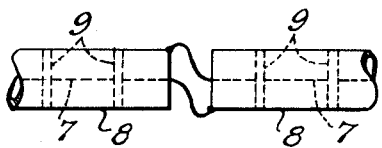
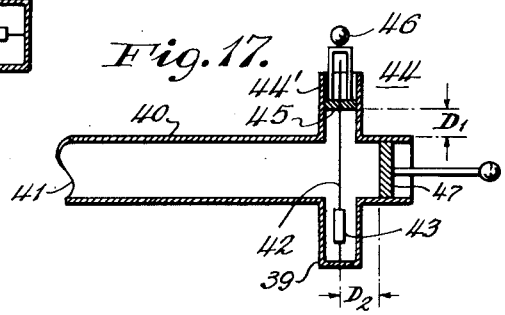
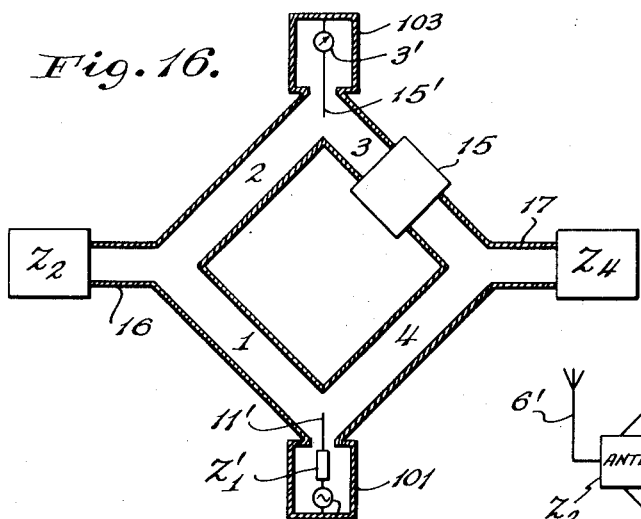
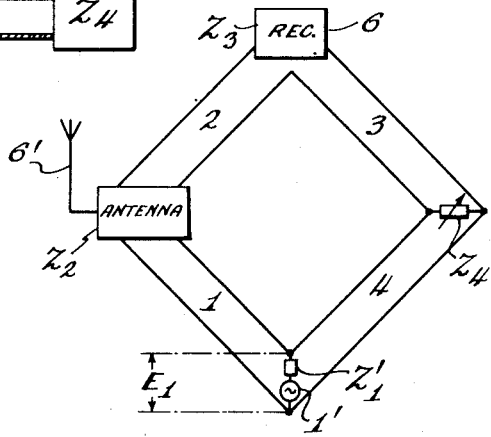
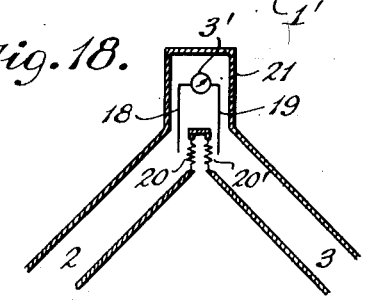

Jan. 12, 1954 W. L. BARROW 2,666,132
ULTRAHIGH-FREQUENCY BRIDGE CIRCUIT AND APPARATUS
Filed Jan. 25, 1947 5 Sheets-Sheet 4

INVENTOR.
WILMER L. BARROW
BY
Paul B. Hunter.
ATTORNEY

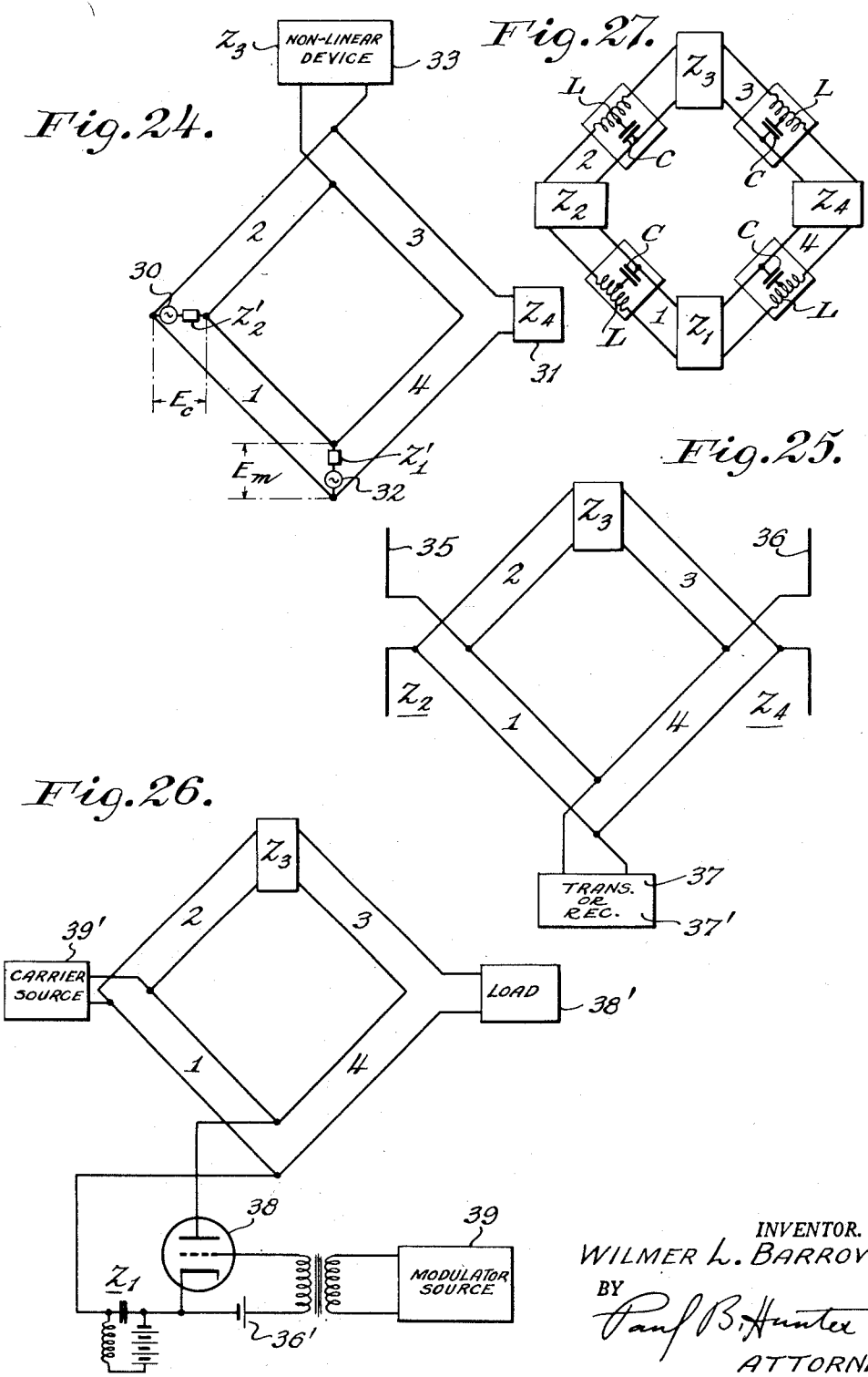

Patented Jan. 12, 1954

2,666,132

UNITED STATES PATENT OFFICE 2,666,132

ULTRAHIGH-FREQUENCY BRIDGE CIRCUIT AND APPARATUS

Wilmer L. Barrow, Manhasset, N. Y.

Application January 25, 1947, Serial No. 724,390

13 Claims. (Cl. 250—13)

This invention relates to ultra-high-frequency bridge circuits and refers, more particularly, to bridge circuits in which transmission lines are essential elements. The present application is a continuation-in-part of my application Serial No. 376,253 filed January 28, 1941, now Patent No. 2,416,790 granted March 4, 1947.

The difficulties encountered in extending the use of conventional bridge circuits to ultra-high frequencies are well known and are very great. Bridges have been constructed that function at frequencies as high as ten megacycles or even somewhat higher but little work has been done at very high frequencies such as those of the order of 100 megacycles and above, due to complications and uncertainties which arise and which increase rapidly with increasing frequency. For example, as applied to the measurement of impedance, the use of bridge circuits at ultrahigh frequencies is adversely affected by the impedance and calibration of the indicating instrument, by the effect of leads to auxiliary equipment, and by similar factors which vary with frequency, so that the useful frequency range of a given piece of equipment is usually very limited. In addition, conventional circuits do not provide true equivalents of bridge circuits at high frequencies in many applications where it is desirable to take advantage of the characteristics of a bridge connection.

My improved circuit making use of transmission lines as bridge elements, among other advantages, provides the complete equivalent of a bridge, while in the form adapted for making impedance measurements, the impedance of the indicating instrument and its calibration do not enter into the precision of the measurement.

The term transmission line as used herein in its narrower sense refers to any means for guiding electromagnetic waves which provides a restricted path having distributed electrical constants, such as of the two-wire or hollow wave guide or dielectric guide type, but it also has a wider meaning which includes, in addition, lumped impedance artificial transmission lines having propagation characteristics similar to those of actual transmission lines. While the length of transmission lines having distributed constants is a bar to their use in most low frequency apparatus, at high frequencies they become relatively short, which makes their use practical in a wide variety of applications. For example, at 300 megacycles a quarter wave length line is approximately only 10 inches in length.

An object of the present invention is to provide a novel device suitable for operation at ultra-high frequencies having the same general characteristics as conjugate-circuit devices commonly used at low frequencies, such as hybrid coils.

Another object is to provide novel arrangements for interconnecting a plurality of circuits with one or more other circuits, so as to inhibit interaction among the said plurality of circuits.

Another object is to provide a bridge circuit of the character described employing metal pipe wave guides and adapted for interconnection in systems of metal pipe wave-guide construction.

A still further object is to provide a transmission line bridge circuit which does not require line transpositions and is therefore particularly adapted to utilize coaxial cable and waveguide lines.

Still another object of the present invention is to provide improved systems utilizing the bridge circuits discussed above.

Other objects and advantages of this invention will become apparent as the description proceeds.

In the drawings,

Figs. 6 to 9 illustrate various forms of impedance elements suitable for connection at bridge points.

Fig. 10 is a schematic diagram partly in cross-sectional view of a shunt-connected impedance element for coaxial line bridges.

Fig. 11 is a similar schematic diagram of a variable impedance element for coaxial line systems.

Fig. 12 is a similar schematic diagram of a shunt-connected source for coaxial line bridges.

Fig. 13 is a similar schematic diagram of a series-connected load for coaxial line bridges.

Fig. 14 is a schematic diagram of a coaxial line bridge similar to Fig. 4.

Fig. 15 is a schematic diagram of a coaxial line transposition.

Fig. 16 is a schematic diagram of a wave guide bridge similar to Fig. 3.

Fig. 17 is a schematic diagram of a wave-guide adjustable impedance element.

Fig. 18 is a schematic diagram of a series-connected indicator for wave-guide bridges.

Fig. 19 is a generalized schematic circuit diagram of a duplex radio communication system utilizing a transmission line bridge.

Fig. 24 is a generalized diagram of a carrier-suppression modulator using a transmission line bridge.

Fig. 25 is a generalized diagram of a double antenna radio receiver or transmitter using a transmission line bridge.

Fig. 26 is a similar diagram of a modified form of a transmission line bridge circuit modulator.

Fig. 27 is a similar diagram of a bridge circuit utilizing artificial lines having lumped impedance circuit elements.

Figure 1:
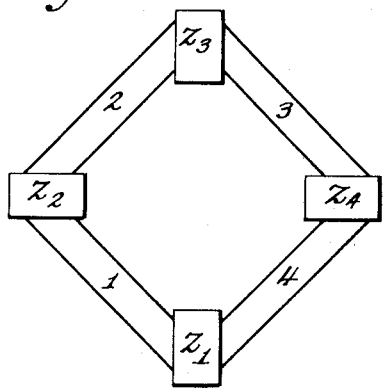
Fig. 1 is a generalized schematic circuit diagram illustrating the connection of four transmission lines in a bridge arrangement with four lumped-impedance circuit elements connected at bridge points.

In Fig. 1 there is shown the basic diagram of a generalized bridge circuit composed of four transmission lines 1, 2, 3, 4 arranged in tandem to form a closed loop, with lumped-impedance circuit elements $Z_1$, $Z_2$, $Z_3$, $Z_4$ connected respectively at the bridge points formed by the junctions between a pair of adjacent lines. In this figure, and in all the following figures, this representation of transmission line is not intended to indicate structurally any particular type of such line, but is intended as a general representation of any type of transmission line, the following being cited as examples and not by way of limitation:

Two conductors unshielded.
Two conductors shielded.
One conductor shielded (coaxial line).
Hollow-pipe "wave guide."
Dielectric-wire "wave guide."

For description of the last two types of transmission lines, reference may be had to U. S. Patents Nos. 2,129,711 and 2,129,712 issued to G. C. Southworth, wherein "wave guides" are defined. It will be shown below how these various types of line are constructed and connected to their corresponding circuit elements. The bridge point impedance elements $Z_1$, $Z_2$, $Z_3$ and $Z_4$ represent any type of circuit element or combination of circuit elements offering impedance of the two-terminal or four-terminal type, and may be the impedances of apparatus units, for example, generators or meters. Specific examples of impedance elements useful as $Z_1$, $Z_2$, $Z_3$, or $Z_4$ are described below and shown in subsequent figures.

Figure 2:
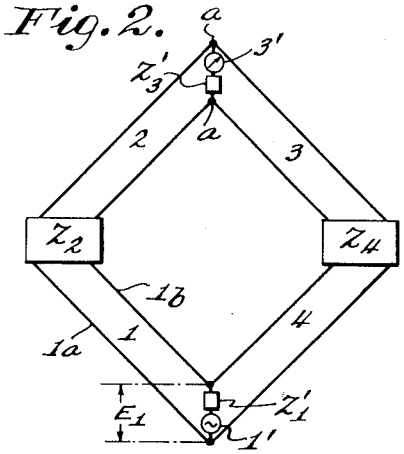
Fig. 2 is a similar schematic circuit diagram of the transmission line bridge circuit of Fig. 1 having a high frequency source and an indicator as the circuit elements connected at a pair of opposite bridge points.

In Fig. 2 there is shown a modification of Fig. 1 in which the impedance element $Z_1$ is formed as a high frequency source or generator 1' connected in series with an impedance element $Z_1'$, which may be provided by the internal impedance of the source 1'. Similarly, impedance element $Z_3$ is formed as an indicator 3' connected in series with an impedance $Z_3'$ which may be indicator impedance.

Ignoring for the moment the two impedance elements $Z_2$ and $Z_4$ it may be considered that the four generalized transmission lines 1, 2, 3 and 4 form a pair of separate transmission paths 1, 2 and 4, 3 between high-frequency source 1' and indicator 3'. If the source 1' impresses a high frequency voltage $E_1$ across lines 1 and 4, electromagnetic waves will travel along both paths and impress two alternating voltages across the impedance $Z_3'$ of the indicator 3'. Assuming that the lines have similar transmission characteristics and lengths, the two alternating voltages impressed by the two respective waves across impedance $Z_3'$ will have the same amplitude and phase while the current flowing in lines 2 and 3 and arriving at the terminals a, a by the two paths 1, 2 and 4, 3 will have the same magnitude but opposite direction, resulting in a voltage anti-node and a current node at this point.

Figure 3:
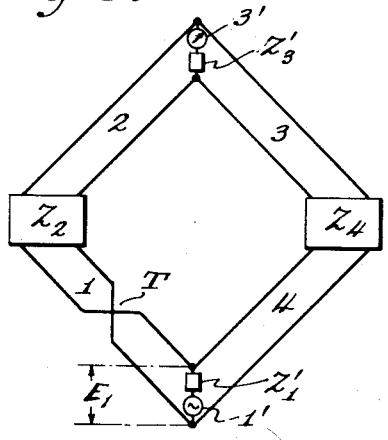
Fig. 3 is a similar generalized diagram of a bridge circuit having shunt-connected impedances at a pair of opposite bridge points and a transposition in one of the lines.

If, as shown in Fig. 3, some means is included in one of the two transmission paths 1, 2 and 4, 3 for shifting the phase of the transmitted wave by 180° (such as, for example, the transposition T shown in line 1 of Fig. 3 when using two-wire lines) the respective voltages at element $Z_3'$ resulting from transmission of waves from source 1' over the two paths 1, 2 and 4, 3 will be of opposite phase, while the currents in lines 2 and 3 arriving at the terminals a, a will be in the same direction, resulting in a voltage node and a current anti-node at the element $Z_3'$ and indicator 3'. Other 180° phase-shifters may be used in place of transposition T, such as a network which produces a phase shift of 180°. This may take the form of a transmission line having a length equivalent to an odd integral number of half wave-lengths, or the network may be composed of lumped impedances, preferably non-attenuating. The shifting of phase by the introduction of a length of transmission line is particularly suited to hollow-pipe wave-guide construction. The net voltage impressed across the indicator 3' will therefore be zero, and the circuit is balanced in the sense that an ordinary bridge network is balanced, since an input voltage applied to one pair of terminals is incapable of producing any output voltage across a second or conjugate pair of terminals. In referring to this condition, one bridge point of a transmission line bridge will be said to be balanced against another bridge point.

The insertion of equal impedances $Z_2$ and $Z_4$, respectively, at corresponding points in the two paths 1, 2 and 4, 3 of either Fig. 2 or Fig. 3 changes, the magnitude of the voltages and currents at element $Z_3'$ and indicator 3' but not their relative phase or the equality of the magnitudes of these quanties. If the lines 1, 2, 3, 4 have dissimilar propagation characteristics, $Z_2$ and $Z_4$ may be made unequal to compensate for such differences, so as to maintain either current or voltage cancellation as in Fig. 2 or Fig. 3. It is not necessary that the length of path 2, 3 be equal to that of path 1, 4, so long as the equality of voltages and currents is maintained at the indicator 3'.

Figure 4:
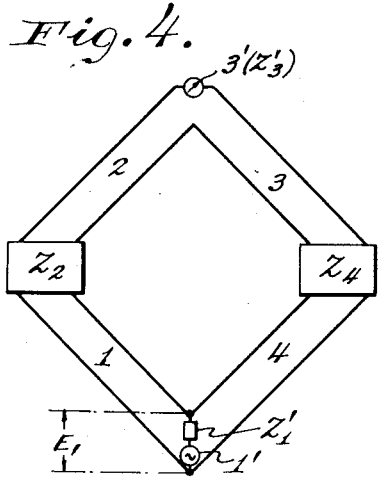
Fig. 4 illustrates a similar generalized circuit diagram of a bridge having a shunt-connected source and a series-connected indicator.

In place of the transposition T of Fig. 3 (or any other 180° phase shifter used in its place), the same ultimate result of bridge balance is obtained by the circuit of Fig. 4, where indicator 3' (which may still have an internal impedance $Z_3'$) is connected in series between adjacent lines 2 and 3, while the remainder of Fig. 4 is the same as in Fig. 2, source 1' being shunt-connected. By a series connection is meant that the indicator 3' is so connected between its adjacent lines 2 and 3 that electromagnetic wave energy flowing from one line toward the other is compelled to flow first through the indicator. This is to be distinguished from a shunt connection, where such energy divides into two parallel paths, rather than flowing sequentially from one element to another, as in a series connection.

As discussed above relative to Fig. 2, the currents arriving at the position of indicator 3' over the two paths 1, 2 and 4, 3 are of equal magnitude and opposite direction, producing a current node. Since indicator 3' as connected in Fig. 4 is responsive to these currents, it will read zero upon balance of the two paths 1, 2 and 4, 3 so that, with this connection, indicator 3' is conjugate to source 1' and a true bridge arrangement is obtained here also.

Figure 5:
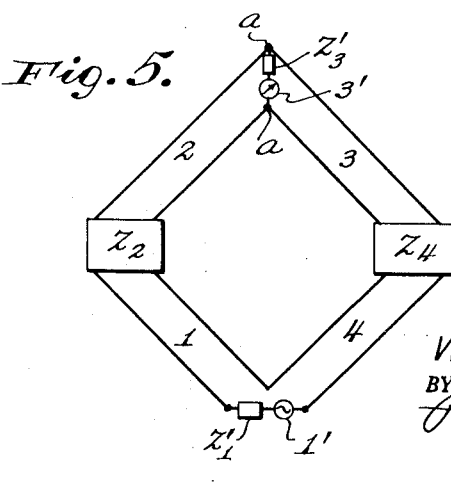
Fig. 5 illustrates a similar generalized circuit diagram of a bridge having a series connected source and shunt-connected indicator.

A balanced bridge arrangement can also be obtained by use of a series-connected source and shunt-connected load or indicator, as in Fig. 5. Source 1', being connected across the series circuit formed by the open end of transmission line 1 and the open end of line 4 (each being a four-terminal network with distributed inductance and capacitance) excites lines 1 and 4 with voltages of the same magnitude but opposite phase. With paths 1, 2 and 4, 3 balanced, these waves produce a voltage node at the terminals $a, a$ at which indicator 3' is shunt-connected, again providing a true bridge arrangement. This construction of Fig. 5 is especially of advantage in certain types of two-wire line construction, since connection is made to one conductor only of a line or pair of adjacent lines.

Where, as is usual, all circuit elements are linear and bilateral, the generator or source and the indicator (or any receiver or load taking its place) are interchangeable, either may be connected in series between terminal portions of two adjacent transmission lines or as a common shunt element to both.

As described above, the circuits of Figs. 3, 4 and 5 are true bridge circuits producing null output across the indicator 3' (or any load substituted for it) when an input voltage is applied by source 1'. It will be seen that, when source 1' and indicator 3' are similarly connected (both shunt-connected or both series-connected, as in Figs. 2 and 3) a 180° phase shifter or transposition in one of the two paths 1, 2 or 4, 3 is necessary, these paths being otherwise electrically the same. However, when source 1' and indicator or load 3' are oppositely connected (one shunt-connected and the other series-connected) no phase shifter or transposition is necessary.

Where, instead of being used for null indication, indicator 3' is intended to indicate the magnitude of the voltage or current anti-nodes at its position, the type of connection of either source 1' or indicator 3' in Figs. 3, 4 or 5 is reversed (that is, changed from series to shunt connection, or vice versa) or else a 180° phase shift or transposition is added in one of the transmission paths 1, 2 or 4, 3.

As stated above, the representation of transmission lines 1, 2, 3, and 4 in the drawings is intended to be generalized, and not to indicate any particular type of transmission line. However, where these transmission lines are of the parallel-wire type (either shielded or unshielded) the two drawn lines of the figures (such as 1a, 1b, for example) may be considered to represent respectively the two conductors of the parallel-wire transmission line. Similarly, where a coaxial or concentric transmission line is intended, one of the drawn lines (such as 1a) may be considered to represent the inner conductor while the other (such as 1b) represents the outer conductor, as will be more fully described below. Also, where dielectric-wire or hollow-pipe wave guides are intended, the drawn lines 1a, 1b may be considered to represent, in axial cross-sectional view, the outer opposed boundaries of the wave guide between which exists the maximum voltage (which may be taken as the line integral of the electric field intensity). In the case of dielectric-wire guides, these drawn lines would represent the outer surface of the dielectric wire. In the case of hollow-pipe guides, these drawn lines would represent cross-sections of the pipe walls. Such structures are also described below.

As indicated above, impedance elements $Z_2$ and $Z_4$ may be formed in a variety of ways. Figs. 6 to 9 show various forms of such impedance elements suitable for use with two-wire transmission lines. Fig. 6 shows a single shunt-connected impedance element $Z_p$ connected between the two conductors 1a, 1b, forming line 1 and connected respectively to conductors 2a, 2b forming line 2. Fig. 7 shows a simple series-connected impedance element $Z_s$ connected in series between conductors 1a, 2a. (It may alternatively be connected in series between conductors 1b, 2b.) Also series elements may be used in both conductors 1a, 2a and 1b, 2b. Fig. 8 shows a T connection having shunt element $Z_p$ and symmetrical series elements $Z_s'$ while Fig. 9 shows a $\pi$ connection having series elements $Z_s$ and symmetrical shunt elements $Z_p'$. Each type of connection has advantages in specific circuits. It is to be understood that any of these impedance elements may itself be a complex impedance or network made up of resistive and reactive components.

Fig. 10 shows one form which the balancing impedance $Z_2$ or $Z_4$ may assume when using coaxial lines. Here shunt impedance element $Z_p$ is connected at one end to the junction of inner conductors 1a', 1b' and at the other end to extension 102 of the junction of the outer conductors 1b', 2b', which extension also serves to maintain continuity of the shielding enclosure provided by the outer conductors.

An adjustable form of impedance element highly suitable for coaxial-type bridges is shown in Fig. 11. In this figure a section of coaxial line 50 is shown adapted to be joined at end 51 to a coaxial bridge. For example, the inner conductor of the device of Fig. 11 may be connected at its end 51 to the junction between conductors 1a', 2a' of Fig. 10, while the outer conductor of the line section 50 is connected to the junction of line outer conductors 1b, 2b of Fig. 10. The adjustable coaxial impedance element of Fig. 11 comprises an adjustable shunt reactance in the form of a coaxial line section having outer conductor 54 and inner conductor 52 connected in shunt across the line 50. This section of line is provided with an adjustable short-circuiting plunger 55 so that its length $D_3$ may be varied. By this means, a reactance of either positive or negative character and of any desired magnitude may be connected across the line. A further element of this adjustable impedance element comprises a line section having an outer conductor 58 and an inner conductor 59. This latter section is connected to the line 50 at 60, and this junction may be made adjustable by providing sliding connections between the two lines. Two adjustable plungers 61 and 62 provide any desired distance $D_4$ between their respective faces. Of particular importance in its application to balancing a bridge is a length $$D_4 = \frac{n\lambda}{2}$$

where $n$ is a positive integer, preferably 1, and $\lambda$ is the wavelength. For this length, the line section between the plungers 61 and 62 provides a resonant electrical system offering purely resistive impedance, and this resonant system is connected to the transmission line at a distance $D_5$ from one plunger. The magnitude of the resistive impedance connected across the line 50 at the point 60 may be varied between wide limits by appropriate adjustment of the length $D_5$, as by ganged variation of plungers 61 and 62 while maintaining fixed separation therebetween. By relatively varying the shunt reactance element 54 and the substantially resistive element 58 any value of complex impedance may be made to appear at the terminal 51, thereby providing an adjustable impedance element useful as elements $Z_2$ or $Z_4$ in a coaxial line bridge of the present type.

Figs. 12 and 13 illustrate how a shunt or series connection of source 1' or indicator 3' may be made for coaxial lines. Fig. 12 shows a shunt connection for source 1', similar to the shunt connection shown in Fig. 10, impedance $Z_1'$ being connected in series with source 1' between the junction of inner conductors 1b', 4b' of lines 1 and 4 and the enclosing housing 101 connected to and forming a continuation of outer conductors 1b', 4b' of these lines.

Fig. 13 shows a series connection for source 3', in which source 3' and impedance $Z_3'$ are connected in series between inner conductors 2a', 3a' of lines 2 and 3. Outer conductors 2b', 3b' of these lines 2, 3 are extended as an enclosing shield 103 around indicator 3' and impedance $Z_3'$.

It will be understood that the arrangement of Fig. 12 may be used equally well for a shunt-connected indicator or load, merely substituting indicator 3' for source 1', and its impedance $Z_3'$ (if any) for impedance $Z_1'$. Similarly, in Fig. 13 source 1' and its impedance $Z_1'$ may be substituted for indicator 3' and impedance $Z_3'$ where a series-connected source is desired.

To illustrate how the elements of Figs. 10, 12 and 13 may be incorporated in a complete bridge system, reference is had to Fig. 14, which is a coaxial line form of the general bridge shown in Fig. 4. In Fig. 14, the source and indicator of Figs. 12 and 13 are used, while the balancing impedances are as in Fig. 10. This construction eliminates the necessity of transpositions or phase-shifting devices in one of the lines. A schematic showing of a transposition in a coaxial line, which illustrates the disadvantages of such arrangements, is found in Fig. 15. The transmission line consists of central conductor 7 and cylindrical metallic envelope or shield 8 coaxial therewith, the two conducting members being spaced at intervals by insulating washers 9. In order to connect the central conductor on one side of the transposition to the shield on the opposite side and the shield on the first side to the central conductor on the other side to effect a transposition, a break in the otherwise continuous outer envelope is necessary which results in leaving a certain portion of the line unshielded and therefore subject to radiation losses. A further disadvantage of a transposition in a coaxial line is that currents may leave the internal shielded portion of the line at the place of transposition and travel along the outside of the shield, resulting in a substantial loss of the shielding effect of the outer conductor of the line. The basic series connection of Fig. 13 or 14, however, obviates this difficulty completely and provides a bridge which may be substantially perfectly shielded from interference by or to external systems.

To illustrate the structure of a wave guide form of bridge, attention is directed to Fig. 16, showing a hollow-pipe wave guide bridge of the general type shown in Fig. 3. In this figure the pipes are assumed to be seen in axial section, and it is to be understood that the two sectional lines connecting adjacent bridge points represent diametrically opposite portions of a single hollow conductor, preferably cylindrical in form, with any desired type of transverse cross-section. This way of realizing the bridge of the present invention affords unusual adaptability to microwaves, i. e., waves whose lengths are, say, a few centimeters or less. At these extremely short wavelengths, ordinary lines, including even the coaxial form, have high losses because of the imperfections in the insulators separating the two or more conductors of the line, and the construction of coaxial lines is difficult because their permissible size becomes quite small. The hollow-pipe modification, however, circumvents these difficulties and provides an efficient bridge even at the highest frequencies used in radio. Furthermore, the operation of a hollow-pipe bridge of this type with waves of the hollow-pipe type affords opportunities for a unique mode of operation. For example, the phase velocity of the waves may be made appreciably greater than the velocity of light in a medium having the same constants as those of the medium inside of the pipe, permitting unexpected design features, such as a physical lengthening of the paths 1, 2, 3, 4 for an effect equivalent to that of a coaxial line of shorter length, where this is desirable.

In the arrangement of Fig. 16, one terminal of indicator 3' is connected to an extension 103 of the cylindrical conductors or pipes 2, 3 forming the outer conducting boundary for the electromagnetic waves, while the opposite terminal is connected to a terminal rod or probe electrode 15' positioned to receive energy from the waves existing at the center of the pipes 2, 3. This arrangement is a shunt connection for the indicator 3, as shown for example, in Fig. 2. A similar connection is used for source 1', with a probe 11'. A phase-shifting device, which may be a line an odd number of half wavelengths long, is shown at 18. The balancing impedances $Z_2$ and $Z_4$ intermediate the source 1' and indicator 3' in this construction take the form of pipe extensions 16 and 17, respectively, which may be terminated in any suitable manner, one form of such termination being shown in Fig. 17. Appropriate terminations for hollow wave guides may be designed to give any desired impedance characteristic. It will be understood that the pipes 16 and 17 may extend appreciable distances before reaching the point of termination.

It will also be understood that in any of the present bridges, the invention is not limited to the use of non-radiating purely absorptive impedance $Z_2$ or $Z_4$, as one or both of impedances $Z_2$ or $Z_4$ may be arranged for radiation or to include radiating means when it is desired to radiate part of the energy delivered to its bridge point by source 1'. In particular, with wave guide bridges, if the end of a wave guide is left open either with or without a flare, radiation will take place into the space beyond the mouth of the guide, as explained in my articles in the proceedings of the Institute of Radio Engineers, vol. 24, pages 1298, 1326 (October, 1936) and vol. 26, page 1498 (December, 1938). Such a radiating wave guide may thus be coupled to the pipes 16 or 17 of Fig. 16. When energy is radiated at a bridge point adjacent the source, an indicator at the point opposite the source may not be required. In this case indicator 3' may be replaced by a balancing impedance.

An adjustable termination for a transmission line bridge constructed in hollow-pipe form according to the invention is shown in Fig. 17. In this figure, a section of hollow-pipe guide 40 is adapted to be connected at one end 41 to a pipe extension of the bridge, for example, pipe 16 or 17 of Fig. 16. The termination includes a conducting rod 42 extending transversely to the pipe axis having a resistance 43 connected between one end of the rod and an extension 39 of the wall of the pipe 40, while at its other end the rod 42 forms a part of a coaxial line section 44 having rod 42 as central conductor and also having an outer conductor or shield 44' similar to extension 39. Short-circuiting plunger 45, which is shown as adjustable by means of the rods and handle 46, determines the effective length of the coaxial line section 44. This coaxial line portion 44 of the terminal device of Fig. 17 provides a series reactance for the rod 42. A second plunger 47 tightly closes the end of the pipe 49 opposite to end 41. The adjustable length of hollow pipe between the rod 42 and the plunger 47 provides an adjustable shunt reactance for the transverse rod 42. For a given value of the resistance or impedance 43 the lengths $D_1$ and $D_2$ may be so adjusted as to provide an impedance match for the pipe connected to 41. Other adjustments of the lengths $D_1$ and $D_2$ and other values of the impedance 43 provide impedances of other desired values. Terminal means such as illustrated in Fig. 17 are particularly adapted for the operation of the bridge in hollow-pipe form with waves of the type referred to in the aforementioned Patent No. 2,129,712, as a symmetric magnetic or $H_1$ type. Other terminal arrangements may be employed for this wave or other types of waves.

A series connection for a source or indicator when using hollow-pipe wave guide is shown in Fig. 18. The indicator 3' in this case is connected to a pair of electrodes 18 and 19 positioned to receive energy from the waves arriving over the two hollow-pipe lines 2 and 3, respectively. Indicator 3' is preferably enclosed in a shielded compartment 21. Each pipe 2, 3 may be terminated in its characteristic impedance, this being represented symbolically only by impedances 20 and 20', to prevent undesired wave reflections. The actual terminations employed are to be understood as being of any conventional type suitable for connection to hollow-pipe lines. If desired, source 1' may be substituted for indicator 3' to provide a series-connected source. Said series-connected sources or indicators may be utilized in any of the bridge circuits shown in the preceding figures, when using hollow-pipe guides.

It will be understood that in any of the present circuits, any desired power-utilizing device or load may be used in place of the indicator 3'.

The preceding discussion has described the construction of various types of bridge circuits according to the present invention, and has explained the theory underlying their bridge-type operation. The following discussion and description is devoted to various uses to which such bridges can be put, and will be understood to apply to any of the forms of bridges described above, except where otherwise noted.

Any of the above types of bridge producing null output may be used for impedance measuring purposes. Thus, one of the balancing impedances (for example, $Z_2$) may represent a circuit element of unknown impedance. The other balancing impedance ($Z_4$) is then a calibrated impedance element.

Indicator 3' furnishes zero indication when the impedances $Z_2$ and $Z_4$ are equal, it being understood that in this case the two transmission line paths 1, 2 and 4, 3 connecting source 1' and indicator 3' also have the same transmission characteristics. Thus, the value of the unknown impedance $Z_2$ is determined from the known value of calibrated impedance $Z_4$. The impedance of neither source of indicator affects this relationship. Of particular importance is the fact that the meter may have a low impedance and that it requires no calibration either for linearity or voltage. Furthermore, the balance may be made at any frequency provided only that the lines are long enough to function as transmission lines at that frequency.

Fig. 19 shows the system of Fig. 4 applied to duplex communication. It will be noted that, in the preceding arrangements, while a balance is obtained between source 1' and indicator 3', power from source 1' is delivered to impedances $Z_2$ and $Z_4$. Also, if power is supplied directly to impedance $Z_2$, it will be transmitted to indicator 3'. This feature is utilized in Fig. 19. In this figure, generator 1', which may be the output stage of a radio transmitter as before, supplies an E. M. F. $E_1$ through its internal impedance $Z_1'$ by shunt connection to lines 1 and 4. Impedance element $Z_2$ in this case is an antenna 6' which simultaneously transmits and receives energy while element $Z_4$ is an adjustable balancing impedance therefor. If series-connected element $Z_3$ is a radio receiver at the bridge point opposite the transmitter 1', which is to be insensitive to the output of generator or transmitter 1', and if element $Z_4$ is adjusted to balance antenna impedance $Z_2$, a network is obtained in which power from the transmitter 1' is delivered to antenna 6' without affecting receiver 6, while power received by antenna 6' is delivered to receiver 6.

Fig. 19 may also be used as an object detecting system. High frequency energy produced by transmitter 1' is radiated by antenna 6' toward an object to be detected. Energy reflected by the object returns to antenna 6' and actuates receiver 6 to indicate the presence of the object.

The velocity of the object may be indicated by making the bridge circuit slightly unbalanced, so that a small portion of the transmitter energy reaches the receiver together with the received energy. As is known, if the object is moving toward or away from the antenna, the energy reflected by it and received by antenna 6' and receiver 6 is shifted in frequency by the Doppler effect. The received wave and the small portion of the transmitted wave are heterodyned by receiver 6 and the resultant difference frequency is proportional to object velocity and may be suitably indicated.

Figure 20:
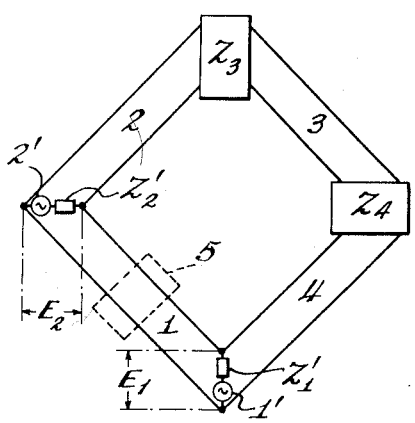
Fig. 20 is a similar generalized diagram of a doubly balanced bridge using two sources.

Fig. 19 is thus an example of a circuit in which power is supplied both to impedance element $Z_1$ (from source 1') and to impedance element $Z_2$ (from antenna 6'). Other circuits to be described herein also involve the connection of sources of E. M. F. at a plurality of bridge points. For example, additional E. M. F.'s may be applied at other bridge points, as shown in Fig. 20, where impedance $Z_2$ is formed by a generator source 2' applying an E. M. F. $E_2$ in series with an impedance $Z_2'$, which may be its internal impedance, in addition to source $I'$ connected to impedance $Z_1'$. The remainder of the circuit of Fig. 20 is similar to that of Figs. 1 or 2. It will be understood that, for a shunt-connected load $Z_3$, a 180° phase shifter 5 is used, although this may be omitted for a series-connected load $Z_3$. Hence, since the transmission paths 2, 3 and 1, 4 are otherwise identical, if impedances $Z_1'$ and $Z_3$ are equal, power will be delivered from source 2' to both elements $Z_1'$ and $Z_3$ and excluded from element $Z_4$. If, further, the impedances $Z_2$ and $Z_4$ are equal, power will be delivered from source 1' to both elements $Z_2'$ and $Z_4$ and excluded from element $Z_3$. This arrangement will be referred to as a double balance.

A voltage derived from a parallel or shunt connection of a generator to the circuit may of course be impressed across any of the impedances in either a doubly balanced or any of the preceding circuits instead of a series-impressed E. M. F.

It is possible to extend balancing arrangements of the described character so that power generated at any of the bridge points may be supplied to the two adjacent bridge points and excluded from the opposite bridge point.

In a doubly balanced system, if one of the balances is destroyed another type of interconnection of two sources is provided. For example, referring to Fig. 20 let the balance of $Z_4$ against $Z_2$ be destroyed so that an E. M. F. impressed on the network by source $I'$ in series with $Z_1'$ will cause currents to flow in all of elements $Z_2'$, $Z_3$, and $Z_4$, but by letting the balance of $Z_1'$ against $Z_3$ be preserved, an E. M. F. impressed on the network by source 2' in series with $Z_2'$ will cause currents in elements $Z_1'$ and $Z_3$ but not in element $Z_4$. Under such conditions, power from the source $I'$ may be supplied to three elements connected to the bridge, while power from source 2' is fed to only two elements and is excluded from the remaining or diametrically opposite element.

Figure 21:
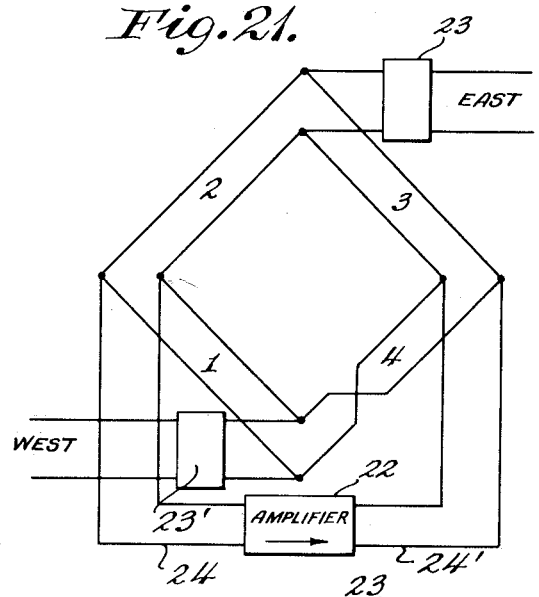
Figs. 21 to 23 are generalized diagrams of bridges used in high frequency two-way repeaters.

An important application of the principle of excluding power from an opposite bridge point while supplying power to bridge points adjacent the source is in a two-way repeater in a high frequency communication circuit in which a wave travelling in either direction along the line may be amplified and retransmitted in the same direction, or both directions, by means of an amplifier so connected as to prevent singing or oscillation. A repeater of the so-called "21" type, that is, a two-way repeater having a single amplifier element 22, is shown in Fig. 21 where the east line and west line are connected to and form the impedances at two opposite bridge points of a balanced transmission line bridge of the type of Fig. 3, with amplifier 22 connected across the conjugate bridge points. Impedance adjusting networks 23 and 23' are preferably included in the east and west lines, respectively, to facilitate balancing the bridge.

In such a circuit, a wave travelling from east to west arrives at the junction of lines 2 and 3 and divides between these two paths. Due to the passage of the wave over the path including lines 2 and 1 an E. M. F. is generated at the junction of lines 2 and 1, which, when applied to the input 24 of amplifier 22, causes a greatly amplified voltage from the output 24' of this amplifier to be applied at the junction of lines 3 and 4, from which point the amplified wave reaches the west line over two paths, i. e., line 4 and lines 3, 2, and 1. Another portion is transmitted back to the east line over the bridge.

As is shown above, if the line impedances connected at the junctions of lines 1, 4 and 2, 3 are adjusted to equality, none of the output of the amplifier 22 is transmitted to the input at the opposite bridge point, and therefore undesirable "singing" or amplifier oscillation cannot occur. Similar considerations apply to the amplification of a wave arriving over the west line.

Figure 22:
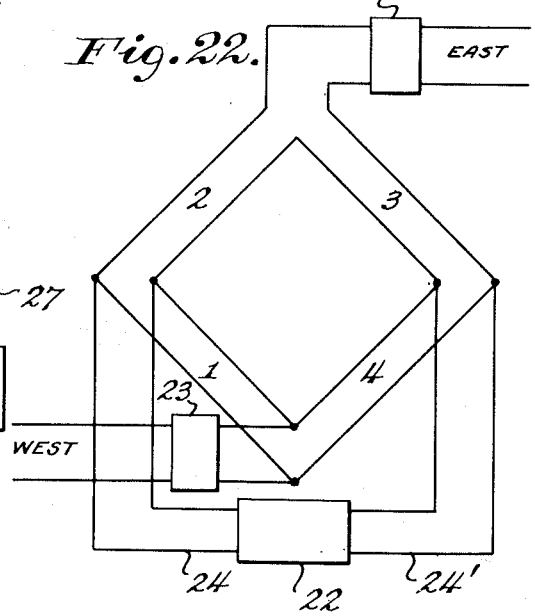

While the east and west lines of Fig. 21 are shown as shunt connected to the bridge, so far as balancing is concerned the characteristic impedances of these lines act merely as terminating impedances for the bridge, and a series connection as shown for example in Figs. 4 and 5 may be employed, in which case no transposition or 180° phase shift is required. Such a series connection is shown in Fig. 22, of the general type of Fig. 4.

Figure 23:
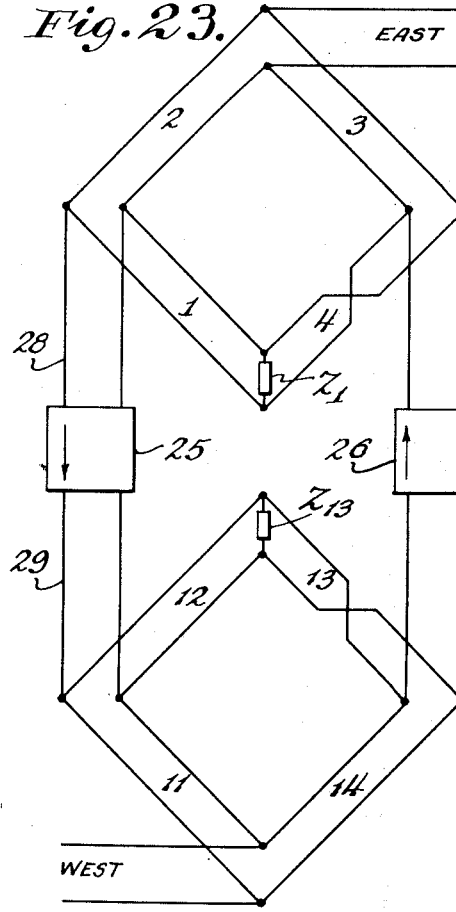

Fig. 23 represents a repeater of the so-called "22" type, that is, a two-way repeater having two separate amplifying elements 25 and 26, each serving to amplify transmission in one direction only as indicated by the arrows. In this case the east line, for example, is balanced by an impedance element $Z_1$ at the opposite bridge point of one transmission line bridge having arms 1, 2, 3, 4 to which it is connected, element $Z_1$ having an impedance equal to the characteristic impedance of the east line. An E. M. F. is applied by a wave over the east line at the bridge point between lines 2 and 3, and through these lines is applied to the output 27 of amplifier 26 and to the input 28 of amplifier 25, respectively. Due to the directional characteristics of the amplifiers, only the voltage applied to the input 28 of amplifier 25 is effective, producing an amplified voltage at the output 29 which is applied to one bridge point of the lower bridge circuit having lines 11, 12, 13, 14, and thus reaches the west line.

Similarly, a wave arriving by the west line arrives at the junction between lines 11 and 14 of the lower transmission line bridge. The west line is balanced by impedance $Z_{13}$ at the opposite bridge point. The incoming wave is prevented from passing to the upper bridge through amplifier 25 because of its unilateral characteristic, but is amplified by amplifier 26 and reaches the east line by way of line 3 and lines 4, 1, 2 of the upper bridge. It will be apparent that energy cannot be transferred around the conducting loop formed by the two amplifiers and bridges since the input of one amplifier is applied at the conjugate bridge point of a balanced bridge from that point at which the output of the other amplifier is applied. The amplifiers therefore cannot "sing" around the loop.

Fig. 24 illustrates the application of the present high frequency transmission line bridge circuit to a modulator in which the carrier frequency is suppressed. In this application, a carrier source 30 supplies an E. M. F. $E_c$ through the impedance $Z_2'$ to the junction point between lines 1 and 2 of the bridge. The load 31 having an impedance $Z_4$ in this case is shown for illustration as connected in series between lines 3 and 4 at their junction. A modulating source 32 is connected in series with an impedance $Z_1'$ across the junction of lines 1 and 4, while element $Z_3$ is a non-linear device or mixer 33 connected across the junction of lines 2, 3. Since no transpositions are employed, no power due to the carrier source 30 will appear in load $Z_4$ so long as the impedances $Z_1'$ of undulating sources 32 and the effective internal impedance $Z_3$ of mixer device 31 at carrier frequency are balanced. The impedance $Z_2'$ of the carrier source 30 and the load impedance $Z_4$ are chosen not to fulfill the condition for balance, so that device 33 will receive power from both the carrier and modulating sources. Due to the non-linear characteristics of this device, modulation occurs and the side bands resulting from such modulation supply power to the load impedance $Z_4$, the carrier being excluded.

Fig. 25 illustrates another important application of a high frequency bridge circuit in providing a connection between two radio antennas either for transmitting or receiving such that there is no interaction of one antenna on the other, as for diversity reception, or directional transmission. By this means, individual tuning, phasing, or other adjustments of either antenna may be carried on without affecting the other antenna.

In Fig. 25, antenna 35 is shown as connected in the place of impedance $Z_2$ of the basic bridge circuit of Fig. 1, while antenna 36 is shown as connected in the position of impedance $Z_4$. These designations will be retained for the impedances of the respective antennae. A device 37, 37', which may be either a transmitter or receiver depending on whether antennae 35 and 36 transmit or receive energy, is shown connected in the position of $Z_1$, while impedance element $Z_3$ balances the impedance of the said transmitter 37 or receiver 37'. It will be apparent that E. M. F.'s originating in either antenna will have no effect on the other antenna when the bridge is balanced, but the antennae 35, 36 will supply energy to receiver 37' during reception, while on the other hand, during transmission the antennae 35, 36 will be independently supplied by transmitter 37.

Fig. 26 shows another form of modulating circuit employing a transmission line bridge, differing from Fig. 24 only in the manner in which the modulating E. M. F. is supplied. In this circuit impedance $Z_1$ of the basic circuit is the output impedance of an electron discharge device 38 which, by the inclusion of a suitable biasing E. M. F. in the input circuit, as from battery 36', may be varied under the control of an E. M. F. supplied by modulating source 39. If, for a particular value of tube output impedance, a balance against impedance $Z_3$ is obtained, no energy from carrier source 39' is supplied to load 38'. As the output impedance of tube 38 is caused to vary from this value by the input modulating voltage supplied from modulating source 39, the carrier energy supplied to load 31 varies proportionally, so that modulation takes place.

As has been pointed out, my invention includes circuits in which there are substituted for transmission lines with distributed constants, simulated lines comprised of lumped impedances. Thus, in any of the embodiments of the invention described above, the indicated transmission line can be replaced by an artificial line having lumped-impedance circuit elements and simulating in well-known manner a distributed-constant transmission line. A generalized bridge circuit using such artificial lines is illustrated in Fig. 27.

In general, to simulate actual transmission lines, artificial lines will have series resistance and inductance and shunt capacitance and conductance, although the relative importance of these several factors will vary with the frequency range for which the apparatus is designed, and one or more of them may be omitted in some applications. As an illustration, in the circuit of Fig. 27 only series inductance L and shunt capacitance C are shown.

Accordingly, there has been described a basic transmission line bridge and its variations, useful with many different types of transmission lines and in many different types of systems. Such apparatus is especially useful with wave guides and coaxial transmission lines, thereby permitting use at microwave frequencies. It will be understood that any type of transmission line may be used in any of the above systems, in accordance with the present teachings.

Also, in view of the well known Reciprocity Theorem, if all circuit elements are linear and bilateral, the source or generator and the indicator or load are interchangeable. Also, either may be series-connected or shunt-connected, in accordance with the principles set out above.

In some cases the impressed E. M. F., instead of being supplied by an actual generator, may be due to a disturbance induced in one of the lines either externally or by internal variations of the line or terminating impedances, and it may be desired to prevent any effect of this disturbance from reaching the opposite bridge point, while that point is receiving power from adjacent bridge points. The above-described balanced bridge circuits provide means for accomplishing this result.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A carrier suppression modulator comprising a bridge network having transmission lines as the four arms thereof, a source of carrier frequency alternating current connected at one bridge point of said circuit, a series connected load to which side-band power is supplied connected at the opposite bridge point, a source of modulation frequency alternating current connected at one of the conjugate bridge points and a non-linear device connected at the other conjugate bridge point, said source of carrier frequency alternating current, said series connected load, said source of modulation frequency alternating current, and said non-linear device each possessing internal impedance, and said modulating frequency alternating current source and non-linear device having effectively equal impedance at carrier frequency whereby carrier frequency power is substantially excluded from said load.

2. A modulator circuit comprising a bridge network having transmission lines as the four arms thereof, a source of carrier frequency alternating current connected to said bridge at one bridge point thereof, a series connected load connected at the opposite bridge point, said source of carrier frequency alternating current and said series connected load each possessing internal impedance, a constant impedance connected at one of the bridge points conjugate to said first two points, a variable impedance device connected at the other conjugate bridge point, and means for varying the impedance of said variable impedance device to effect modulation of the power supplied to said load by said source of carrier frequency.

3. A modulator circuit as claimed in claim 2, in which said variable impedance device is an electron discharge device whose output impedance is controlled by said impedance varying means.

4. A bridge network having transmission lines as the four arms thereof, a source of energy at one bridge point of said circuit, a series connected load at the opposite bridge point, a control source of energy connected at one of the conjugate bridge points and a balancing impedance at the other conjugate bridge point, said control source and said balancing impedance having substantially equal impedances, whereby said load is controlled independently of said energy source.

5. Bridge circuit means having transmission lines connected as the arms thereof with opposite bridge points and conjugate bridge points formed at the junctions of the arms, energy supply means connected to one of said opposite bridge points, a control source connected to one of said bridge points, and a load series connected to one of the remaining bridge points, whereby the load is controlled by the control source independently of the energy supply means.

6. A circuit network comprising four transmission lines and four impedance elements, said transmission lines being connected in tandem as a continuous loop with one of said impedance elements connected at the junction of each pair of adjacent lines, thereby forming a bridge circuit with said impedance elements at the four bridge points thereof, at least one of said impedance elements being series connected between adjacent lines, an alternating current source connected to impress a potential upon one of said impedance elements for initiating the transmission of electromagnetic waves in opposite directions along a pair of adjacent lines and the lines respectively succeeding them, and a control source connected to impress a potential upon a different one of said impedance elements at one of the bridge points adjacent to said alternating current source.

7. A bridge type network comprising four transmission lines connected as the arms of the bridge, impedance elements connected between adjacent arms at each of the four bridge points, a high frequency alternating current source connected to impress a potential across one of said impedance elements for initiating the transmission of electromagnetic waves over the two adjacent arms of the bridge, means actuated by the potential across the impedance element opposite said source excited element, said means being connected in series between adjacent lines, and a control source connected to impress a potential upon a different one of said impedance elements at one of the bridge points adjacent to said alternating current source.

8. High-frequency apparatus comprising a pair of wave-guide paths, an input connection coupled to both said paths, an output connection also coupled to both said paths, one of said connections being series-connected to said wave-guide paths and the other connection being shunt-connected to said two paths, a transmitter coupled to one of said connections, a receiver coupled to the other of said connections, and a pair of circuits also coupled to said wave-guide paths, one of said circuits comprising a radiating means and the other comprising a circuit element offering an impedance value adapted to maintain a slight degree of bridge unbalance between said transmitter and said receiver.

9. High-frequency apparatus comprising a bridge circuit having a pair of enclosed-field transmission line means, an input connection coupled to both said transmission line means, an output connection also coupled to both said transmission line means, one of said connections being series-connected to said two transmission line means and the other connection being shunt-connected to said two transmission line means, a transmitter coupled to one of said connections, a receiver coupled to the other of said connections, and a pair of circuits also coupled to said two transmission line means and determining by their impedance values the transfer of energy between said connections, one of said circuits comprising antenna means adapted to transmit energy from said transmitter and also adapted to receive energy to be supplied to said receiver and the other of said circuits comprising balancing impedance element means.

10. Apparatus as in claim 9 wherein said impedance element means is adjusted to permit a slight amount of energy from said transmitter to reach said receiver, said slight amount of energy thereby serving as a local oscillation source for superheterodyne reception.

11. A station for high-frequency communication comprising a bridge circuit having a pair of wave-guide elements, a first connection coupled to both said elements, a second connection coupled also to both said elements, one of said connections being series-connected to both said wave-guide elements and the other connection being shunt connected to both said wave-guide elements, a source of high frequency oscillations coupled to one of said connections, a receiver for high frequency oscillations coupled to the other of said connections, and antenna means also coupled to one of said wave-guide elements and adapted to radiate energy produced by said source of high frequency oscillations and to receive energy for supply to said receiver.

12. Apparatus as in claim 11 wherein said receiver is of the superheterodyne type having a mixer stage and wherein balancing impedance element means is provided coupled to one of said two wave-guide elements opposite said antenna coupled means and adjusted to provide a small degree of unbalance for said bridge circuit whereby said mixer stage is excited by energy received by said antenna means and by a small amount of energy derived directly from said source of high frequency oscillations and serving as local oscillation energy for actuating said superheterodyne receiver.

13. A station for high-frequency communication comprising a bridge circuit having a pair of transmission-line elements, a first coupling series-connected to both said transmission-line elements, a second coupling shunt-connected to both said transmission-line elements, a high-frequency source coupled to one of said couplings, a high-frequency receiver coupled to the other of said couplings, and an antenna also coupled to one of said transmission-line elements.

WILMER L. BARROW.

References Cited in the file of this patent
UNITED STATES PATENTS

| Number | Name | Date |
|---|---|---|
| 2,147,809 | Alford | Feb. 21, 1939 |
| 2,239,905 | Trevor | Apr. 29, 1941 |
| 2,410,114 | Tyrrell | Oct. 29, 1946 |
| 2,416,790 | Barrow | Mar. 4, 1947 |
| 2,424,156 | Espley | July 15, 1947 |
| 2,425,084 | Cork | Aug. 5, 1947 |
| 2,524,610 | Strom et al. | Oct. 3, 1950 |